United States Patent [19]

Kitamura et al.

[11] Patent Number: 5,686,558
[45] Date of Patent: Nov. 11, 1997

[54] LIQUID CRYSTAL ORIENTATION FILM AND A LIQUID CRYSTAL DISPLAY ELEMENT

[75] Inventors: Kazuo Kitamura, Ohtsu; Satoshi Okawa, Yamashina-ku, both of Japan

[73] Assignee: Toray Industries, Inc., Japan

[21] Appl. No.: 412,736

[22] Filed: Mar. 29, 1995

[30] Foreign Application Priority Data

Mar. 30, 1994 [JP] Japan ..................... 6-061330

[51] Int. Cl.$^6$ ................ C08G 73/10; B32B 27/00; G02F 1/13; G02F 1/1337
[52] U.S. Cl. ................ 528/353; 528/125; 528/128; 528/170; 528/172; 528/173; 528/176; 528/185; 528/188; 528/220; 528/229; 528/350; 428/1; 428/473.5; 359/36; 359/75
[58] Field of Search .................. 528/125, 128, 528/170, 353, 350, 172, 173, 176, 185, 188, 220, 229; 525/432, 420; 428/1, 473.5; 359/360, 37

[56] References Cited

U.S. PATENT DOCUMENTS

| | | | |
|---|---|---|---|
| 4,798,849 | 1/1989 | Thomas et al. | 521/114 |
| 4,973,137 | 11/1990 | Kozaki | 350/339 R |
| 5,298,590 | 3/1994 | Isogai et al. | 528/188 |

FOREIGN PATENT DOCUMENTS

| | | |
|---|---|---|
| 2-282726 A | 11/1990 | Japan . |
| 5-281554 A | 10/1993 | Japan . |
| 6-273768 A | 9/1994 | Japan . |
| 6273768 | 9/1994 | Japan . |
| WO 94/28458 | 12/1994 | WIPO . |

*Primary Examiner*—Samuel A. Acquah
*Assistant Examiner*—P. Hampton-Hightower
*Attorney, Agent, or Firm*—Austin R. Miller

[57] ABSTRACT

The invention relates to a liquid crystal orientation film having a specific polymer, the main chain of the polymer formed of urea bonds and imide bonds, and a liquid crystal display element incorporating the film. The liquid crystal orientation film does not require high temperature heat treatment when prepared, allowing treatment below about 150° C. Hence, the production of a liquid crystal display element using the liquid crystal orientation film is simplified. Furthermore, other element materials are protected, and the substrate used can be a plastic substrate lower in heat resistance than glass. Moreover, the liquid crystal orientation film is excellent in such properties as liquid crystal orienting capability, heat resistance, transparency, strength and adhesion to the substrate, and has an especially large and stable pre-tilt angle. Therefore, the liquid crystal element using the liquid crystal orientation film can be used for many applications and is especially advantageous as a liquid crystal display element of an STN system.

15 Claims, No Drawings

LIQUID CRYSTAL ORIENTATION FILM AND A LIQUID CRYSTAL DISPLAY ELEMENT

BACKGROUND OF THE INVENTION

The present invention relates to a liquid crystal orientation film and a liquid crystal display element. More particularly, the invention relates to a liquid crystal display element with a liquid crystal orientation film which contains a specific polymer and causes the liquid crystal molecules to be oriented at a large pre-tilt angle against the surface of a substrate.

Liquid crystal displays of STN systems possess excellent contrast and visual characteristics and are widely used in comparison to liquid crystal displays of other systems such as TN systems. However, the display element for an STN system must have its liquid crystal molecules oriented at a large pre-tilt angle against the surface of the substrate.

Orienting liquid crystal in one direction generally involves forming a resin film (liquid crystal orientation film, hereinafter simply called "orientation film") on the surface of a substrate, followed by rubbing the surface of the orientation film in one direction. The resin used for the orientation film is generally a polyimide. Rubbing an orientation film composed of such a resin orients the liquid crystal molecules almost in parallel to the substrate surface, thus it is difficult to orient the molecules at a large pre-tilt angle.

Orienting liquid crystal molecules at a large pre-tilt angle can be accomplished by forming an inorganic film of silicon oxide, for example, on the surface of a substrate by oblique vapor deposition. However, this method is more complicated than the rubbing method and requires a disadvantageously high treatment temperature for industrial application.

The rubbing method is a simple liquid crystal orientation control method and is widely used, but as described above, it is difficult to orient the liquid crystal molecules at a large pre-tilt angle in the case of an orientation film composed of an ordinary polyimide resin. Various proposals have been made to enlarge the pre-tilt angle by changing the chemical structure of the polyimide resin used for the orientation film, or by using special additives. For example, techniques involving mixing a long-chain alkylamine (Japanese Patent Laid-Open (Kokai) No. 87-262829), using a monofunctional compound with a long-chain alkyl group together as a reacting species when a polyamic acid is synthesized as a precursor of the polyimide, introducing the long-chain alkyl group at the ends of molecules (U.S. Pat. No. 4,749,777 and Japanese Patent Laid-Open (Kokai) No. 89-177514), using a compound containing fluorine as a raw material of the polyimide, preparing a fluorine-containing polyimide (Japanese Patent Laid-Open (Kokai) No. 87-127827), using a diamine compound with a long-chain alkyl side chain for introducing the long-chain alkyl side chain into the polyimide (Japanese Patent Laid-Open (Kokai) No. 90-282726), have been disclosed. These orientation film materials with high pre-tilt angles are based on polyimides, and even though polyimides have excellent properties as orientation film materials, they generally require a high film formation temperature of about 250° to 300° C. or more. Thus, the universe of materials available for use as the substrate is restricted to those which can withstand the high film formation temperature.

This problem has been solved by our discovery of a polyurea-based resin which exhibits excellent orientation properties and which does not require a high temperature for film formation. We also discovered a resin composition, excellent as an orientation film and possessing a high pre-tilt angle, based on the resin. The polyurea-based resin and the resin composition have been proposed in Japanese Laid-Open (Kokai) No. 94-273768. The material can form an orientation film at a low temperature (lower than about 150° C.) and can provide a high pre-tilt angle, and orientation film formed from the material exhibits excellent properties.

Unfortunately, the above-described resin still does not provide sufficient pre-tilt angle stability. That is, if a liquid crystal cell prepared by using the resin as an orientation film is heated to a temperature higher than about 100° C., the pre-tilt angle tends to be gradually lessened.

We therefore endeavored to find a composition which would provide a more stable pre-tilt angle without compromising the excellent features of the polyurea-based resin, and, as a result, discovered a remarkable composition with those desirable characteristics.

SUMMARY OF THE INVENTION

It is an object of the invention to provide a liquid crystal orientation film with a more stable pre-tilt angle without impairing the excellent features of the polyurea-based resin.

Another object of the invention is to provide a liquid crystal orientation film which does not require high-temperature heat treatment.

Another object of the invention is to provide a liquid crystal orientation film with excellent liquid crystal orienting capability, heat resistance, transparency, strength and adhesion to the substrate.

Other objects and aspects of the invention will become apparent from the following description.

DESCRIPTION OF THE PREFERRED EMBODIMENT

The liquid crystal orientation fill of the invention is a polymer containing a polyurea-based repeating unit and a polyimide-based repeating unit simultaneously in the same molecule. Specifically, the invention is a liquid crystal orientation film comprising a polymer having a repeating unit represented by the following general formula (I):

where $R^1$ is a divalent organic group and n is zero or unity, and $R^2$ is a divalent organic group, and having a repeating unit of the following general formula (II):

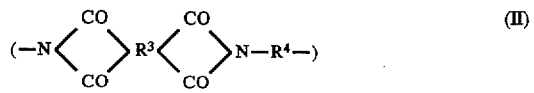

where $R^3$ is a tetravalent organic group, and $R^4$ is a divalent organic group.

A polymer with both polyurea-based and polyimide-based repeating units as described above can be synthesized by polyaddition of a diamine having the following formula (IV), a diisocyanate having the following formula (V), a tetracarboxylic dianhydride having the following formula (VI), and a diamine having the following formula (VII) in a solution, thus producing a precursor polymer containing urea bonds and an amic acid structure:

H₂N—(R¹)ₙ—NH₂, where n is zero or 1    (IV)
OCN—R²—NCO    (V)

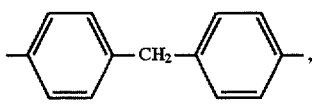    (VI)

H₂N—R⁴—NH₂    (VII)

where R¹ through R⁴ and n are as specified for the general formulae (I) and (II). Dehydrating and ring-closing the amic acid portion for conversion into an imide structure completes the synthesis of the above-described polymer.

(R¹)ₙ is preferably a group in which R¹ is a divalent organic group having an aromatic ring, and more preferably R¹ is a divalent organic group selected from the group consisting of:

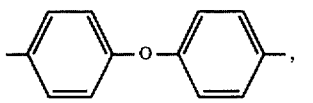

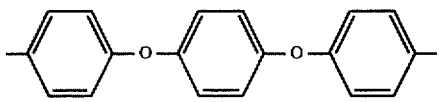

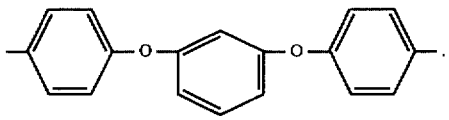

and

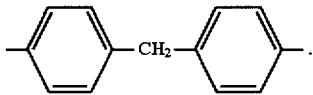

(R¹)ₙ is most preferably in the form in which n is zero.
R² is preferably a divalent organic group having an aromatic ring, and more preferably a divalent organic group selected from the group consisting of:

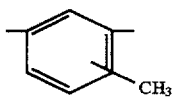

and

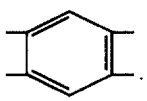

R³ is preferably a tetravalent organic group having an aromatic ring, and more preferably a tetravalent organic group of the following formula:

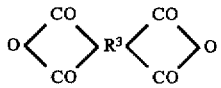

R⁴ is preferably a divalent organic group having an aromatic ring, and more preferably an m-phenylene group or p-phenylene group.

The polymer thus obtained is dissolved in a suitable solvent, and the resulting solution is applied onto the surface of a substrate and dried to obtain an orientation film with excellent properties.

The diamine compound (IV) can be selected, for example, from aromatic diamines such as 4,4'-diaminodiphenyl ether, 3,4'-diaminodiphenyl ether, 3,3'-diaminodiphenyl ether, 4,4'-diaminodiphenylmethane, 4,4'-diaminodiphenyl sulfide, 4,4'-diaminodiphenylsulfone, o-tolidine, 3,4'-diaminobenzanilide, 4,4'-diaminobenzophenone, 2,2-bis(4-(4-aminophenoxy)phenyl)propane, bis(4-(4-aminophenoxy)phenyl)sulfone, 1,4-bis(4-aminophenoxy)benzene, 1,3-bis(4-aminophenoxy)benzene, 1,3-bis(3-aminophenoxy)benzene, 1,5-diaminonaphthalene, m-phenylenediamine, p-phenylenediamine, m-toluylenediamine, 2,2'-dihydroxybenzidine, 3,5-diaminophenol, 3,5-diaminobenzoic acid, m-xylylenediamine and p-xylylenediamine, aliphatic or alicyclic diamines such as tetramethylenediamine, pentamethylenediamine, hexamethylenediamine, octamethylenediamine, dodecamethylenediamine, 1,4-diaminocyclohexane, 4,4'-bis(aminocyclohexyl)methane and isophoronediamine, and diaminoorganosiloxanes represented by the following general formula:

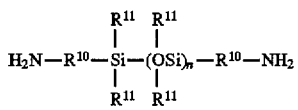

where $R^{10}$ is a divalent hydrocarbon group, $R^{11}$ is a monovalent hydrocarbon group, and n is an integer of 1 or more ($R^{10}$ and $R^{11}$ can be the same or different); hydrazine (anhydrate or monohydrate), isophthalic acid dihydrazide, terephthalic acid dihydrazide, oxalic acid dihydrazide, and others. These diamines can be used singly or in combination of two or more.

The diisocyanate (V) can be selected, for example, from aromatic diisocyanates such as 2,4-tolylene diisocyanate, phenylene diisocyanate, 4,4'-diphenylmethane diisocyanate, 4,4'-diphenyl ether diisocyanate, 4,4'-diphenyl diisocyanate, tolidine diisocyanate, p-xylylene diisocyanate and m-xylylene diisocyanate, alicyclic diisocyanates such as isophorone diisocyanate, 1,3-bis(isocyanatomethyl)cyclohexane, 1,4-bis(isocyanatomethyl)cyclohexane and 4,4'-dicyclohexylmethane diisocyanate, and aliphatic diisocyanates such as butane diisocyanate, hexamethylene diisocyanate, octamethylene diisocyanate and lysine isocyanate. These diisocyanates can be used singly or in combination of two or more.

The tetracarboxylic dianhydride (VI) can be selected, for example, from aromatic tetracarboxylic dianhydrides such as pyromellitic dianhydride, 3,3',4,4'-benzophenonetetracarboxylic dianhydride and 3,3',4,4'-biphenyltetracarboxylic dianhydride, alicyclic tetracarboxylic dianhydrides such as 1,2,3,4-cyclopentanetetracarboxylic dianhydride and bicyclo(2,2,2)-oct-7-ene-2,3,5,6-tetracarboxylic dianhydride, aliphatic tetracarboxylic dianhydrides such as 1,2,3,4-butanetetracarboxylic dianhydride. These tetracarboxylic dianhydrides can be used singly or in combination of two or more.

The diamine (VII) is preferably a diamine with one or more substituent groups represented by the following formula (III), through which an especially high pre-tilt angle can be induced:

—(X)ₒ—(R⁵)ₚ—R⁶    (III)

In the above formula, X is a divalent connecting group and o is zero or one, and the connecting group can be selected from —CONH—, —NHCO—, —COO—, —OCO—, —O—, —NHCONH—, —CO—, among others. $R^5$ is a divalent organic group and p is zero or one, and the organic group preferably has about 2 to 50 carbon atoms and can be selected from p-phenylene, m-phenylene, p-toluylene, m-toluylene, 1,5-naphthylene, 1,8-naphthylene, 1,4-cyclohexylene, etc. $R^6$ is an alkyl group with 12 or more carbon atoms, preferably 14 to 20 carbon atoms or a fluoroalkyl group with 1 or more carbon atoms, preferably 14 to 20 carbon atoms, among others. The diamine compound of formula (VII) can be selected from 3,5-diamino-N-octadecyl-benzamide, 4-octadecyloxy-1,3-diaminobenzene, 3,5-diaminobenzoic acid hexadecyl ester, 5-dodecyl-1,3-diaminobenzene,4-(1H,1H,2H,2H-perfluorodecyloxy)-1,3-diaminobenzene,3,5-diamino-N-(4-trifluoromethylphenyl)benzamide, 1,1,1,3,3-tetrafluoro-2,2-bis(4-(4-aminophenoxy)phenyl)propane, 2,2-bis-4-(4-aminophenoxy)phenyl)hexafluoropropane, among others. These diamines can be used singly or in combination of two or more.

The aromatic content of reacting species (IV) to (VII) is preferably more than about 30 mol %, and more preferably more than about 50 mol %. If the aromatic ingredient content is less than about 30 mol %, the polymer produced has low heat resistance, and the orientation film formed performs poorly.

As for the contents of the raw materials, the molar ratio of the total quantity of ingredients (IV) and (VII) to the total quantity of the ingredients (V) and (VI) is about 0.7 to 1.5, preferably about 0.9 to 1.1. The closer to 1 the ratio is, the larger the molecular weight of the polymer produced.

The polymer of the present invention can be synthesized as described above; that is, by polyaddition of raw materials (IV), (V), (VI) and (VII) in a suitable solvent (capable of dissolving the polymer produced) to synthesize a precursor polymer, then dehydrating and ring-closing the amic acid portion for conversion into imide rings. In the polyaddition reaction, polymers of various structures can be prepared depending on the manner in which the raw materials are mixed. To form repeating unit (II), the diamine (VII) must first be allowed to react with the acid anhydride (VI). Aside from this condition, there are no special restrictions concerning preparation of the polymer. Depending on the conditions, units other than repeating units (I) and (II) may be contained in the polymer without adversely affecting the polymer. For example, a polyimide repeating unit produced by a reaction between ingredients (IV) and (VII) and a polyurea repeating unit produced by a reaction between ingredients (V) and (VI) may be produced, but these repeating units can be contained in the polymer without any problem. As a preferable example of production conditions, the ingredients (VI) and (V) react in a solvent while the ingredients (VI) and (VII) react in a separate solvent, then both the reaction solutions are mixed which enables further reaction. In this case, the ratio of the ingredients (IV) and (V) must not be equimolar. Similarly, the ratio of the ingredients (VI) and (VII) must not be equimolar. There is a range restriction of molar ratios among the four ingredients as described above.

Ingredient (VII) induces the pre-tilt angle, and the quantity of the ingredient determines the pre-tilt angle of the orientation film. In other words, the desired pre-tilt angle fixes the quantity of ingredient (VII) used. In general, when the total quantity of ingredients (IV) through (VII) is about 100 moles, the quantity of ingredient (VII) used should be about 0.5 to 20 moles. The quantity of ingredient (VI) used is preferably greater than the quantity in moles of ingredient (VII) and should be about 0.6 to 30 mol % of the total quantity of all ingredients. The quantities of ingredients (VI) and (VII) determine the quantities of ingredients (IV) and (V) to be used in accordance with the above-described conditions.

If the respective raw materials are used in these quantities, the ratio of the repeating unit (I) to the repeating unit (II) contained in the polymer can be maintained in a range of about 99/1 to 40/60, preferably about 98/2 to 60/40. If the quantity of the repeating unit (I) is too small, the solubility of the polymer and the properties of the paint film are poor. If the quantity of the repeating unit (II) is too small, the pre-tilt angle generated is too small.

The reaction of the above ingredients can be effected by dissolving or suspending the ingredients in a suitable solvent, and allowing them react at about −50° to 200° C., preferably about 0° to 100° C., for about 10 minutes to 24 hours.

The solvent used is not particularly restricted as long as it does not substantially react with the respective raw materials and can dissolve the polymer end-product. The solvent can be preferably selected from N-methyl-2-pyrrolidone (NMP), N,N'-dimethylacetamide (DMAc), dimethylformamide, dimethyl sulfoxide, γ-butyrolactone, 1,3-dimethyl-2-imidazolidinone (DMI), among others.

The polymer (precursor polymer) thus produced must be further dehydrated and ring-closed to produce an imide structure. The precursor polymer can also be directly applied onto a substrate where baking can initiate the ring closure reaction. In such a case, a baking temperature greater than about 250° C. is required to sufficiently promote the ring closure reaction. To produce an orienting material which can be baked at a low temperature, it is preferable to effect the dehydration and ring closure reaction before baking.

The dehydration and ring closure reaction can be effected thermally or chemically, but a chemical reaction in a solution is advantageous since this method does not cause side reactions. For the chemical dehydration and ring closure reaction, adding a dehydrating agent is effective, and it is especially effective to use acetic anhydride as the dehydrating agent and a tertiary amine as a catalyst. If pyridine is used as the amine, the ring closure reaction takes place readily even at room temperature.

A solvent which does not dissolve the polymer end-product, for example, water or alcohol, can be added to the polymer solution obtained as above to isolate the polymer as a solid. The solid polymer can further be dissolved in a solvent suitable for applying the polymer to a substitute in the formation of a liquid crystal orientation film. Both the reaction solution containing the polymer and the reaction solution remaining after evaporation and removal of the low boiling point ingredients can also be used as the solvent after having been diluted to a suitable concentration.

The solvent used is an organic solvent similar to the solvent used for synthesizing the polymer. In addition to the solvents described above, other general solvents such as ethers, esters, ketones, hydrocarbons, halogenated hydrocarbons, etc. can also be used in an amount that does not precipitate the polymer. Those solvents include, for example, acetone, methyl ethyl ketone, methyl isobutyl ketone, cyclohexanone, ethyl acetate, butyl acetate, diethyl oxalate, dioxane, tetrahydrofuran, ethylene glycol monomethyl ether, ethylene glycol dimethyl ether, ethylene glycol monomethyl ether acetate, ethylene glycol monobutyl ether, ethylene glycol monobutyl ether acetate, methylene chloride, chloroform, 1,2-dichloroethane, 1,4-dichlorobutane, trichloroethane, chlorobenzene, o-dichlorobenzene, benzene, toluene, xylene, hexane, cyclohexane, among others. The proper quantity of organic solvent depends on the degree of polymerization and the coating method, but is usually about 0.2 to 50 wt %, preferably about 1 to 20 wt % as solid.

To form a liquid crystal orientation film, the polymer solution prepared as described above is applied onto a substrate with a transparent conductive film on the surface by suitable means, such as spin coating, roll coating or printing, and subsequently heated and dried at about 80° to 300° C., preferably about 100° to 200° C. for about 5 to 180 minutes, preferably about 30 to 90 minutes. Unlike polyimides in general, the polymer of the invention does not require dehydration and ring-closing. Thus, simply removing the solvent completes the application. Consequently, a liquid crystal orientation film with excellent properties can be formed in a mild drying condition of lower than about 150° C.

The thickness of the liquid crystal orientation film is usually about 0.005 to 5 µm, preferably about 0.01 to 2 µm.

As required, a silane-based or titanate-based coupling agent or other suitable coupling agent can be applied onto the substrate to improve adhesion to the substrate. The coupling agent can also be added directly to the polymer solution to be applied to the substrate.

The film thus formed is rubbed with a cloth, such as nylon wound around a roller. Two substrates, each with an orientation film thus prepared, are arranged to face each other, and liquid crystal is injected into the space between the substrates. Thus, a liquid crystal display element of the invention is prepared.

In rubbing, if the individual pixel orientation method is used, the practical angle of visibility for graduation display can be enlarged. The individual pixel orienting method includes the mask rubbing method and the simultaneous rubbing method ("2nd Polymer Material Forum," p. 22-25 (1993)).

In the mask rubbing method, the entire surface of the orientation film formed on a substrate is rubbed (first rubbing), then coated with a photo resist, exposed and developed, to partially expose the orientation film (region A). With the resist as a mask, the orientation film is rubbed (second rubbing) in a direction different from that of the first rubbing. Thus, the orientation film is rubbed twice in region A, which is finally oriented in the second rubbing direction. Then, the resist film is removed, exposing the remaining regions which are still oriented in the first rubbing direction. Thus, the orientation film obtained is different in pre-tilt direction from pixel to pixel.

In the simultaneous rubbing method, a first orientation film is formed on a substrate, and a second orientation film with a different pre-tilt angle from the first orientation film is formed on the first orientation film. The second orientation film is patterned using a resist, for example, to partially expose the first orientation film. The patterned orientation films, different in pre-tilt angle, are rubbed at the same time to obtain an orientation film different in pre-tilt angle from pixel to pixel.

The polymer used for forming the liquid crystal orientation film has the repeating units represented by general formulae (I) and (II), but can also contain other repeating units. The other repeating units include, for example, amide bonds, ester bonds, ether bonds, urethane bonds, among others. However, it is desirable to have the total quantity of the repeating units represented by general formulae (I) and (II) correspond to about 50 mol % or more, preferably about 70 mol % or more of the entire polymer.

Other polymers can be used, such as, for example, polyamides, polyimides, polyesters, acrylic polymers, polyvinyl alcohol, among others. In such a case, it is preferable that the repeating units represented by the general formulae (I) and (II) account for about 50 mol % or more, preferably about 70 mol % or more of all the polymers.

The invention will be described below through illustrative examples. The examples are not intended to limit the invention defined in the appended claims.

In the following examples of the invention and comparative examples, the performance of each liquid crystal orientation film was evaluated by measuring the initial pre-tilt angle and the pre-tilt angle after having been heated. A pre-tilt angle of more than about 3 degrees is adequate. Practical applications require that the pre-tilt angle after heating not decrease significantly from the initially set pre-tilt angle.

EXAMPLE 1

A first solution was prepared by dissolving 9.2 grams (0.046 mole) of 4,4'-diaminodiphenyl ether into 40 g of DMAc, and a solution with 7.40 g (0.0425 mole) of 2,4-tolylene diisocyanate (TDI) dissolved in 20 g of DMAc was added with stirring at room temperature. A second solution was prepared by dissolving 1.61 g (0.004 mole) of 3,5-diamino-N-octadecyl-benzamide into 20 g of DMAc, after which 1.63 g (0.0075 mole) of pyromellitic dianhydride (PMDA) was added. The mixture was stirred until the solid completely dissolved. This second solution was added into the first solution, with stirring. The empty container was rinsed by 20 g of DMAc, which was also added to the mixed solution. The mixed solution was stirred at room temperature for 2 hours to obtain a consistent polymer solution. To the solution, a mixture of 25 g of pyridine and 15 g of acetic anhydride was added, and the solution was mixed and allowed to stand overnight at room temperature. The solution gelled. Fifty grams of DMAc was added to the gel, and the gel mixture was heated in a 100° C. oil bath. The gel was dissolved into an ordinary solution. The solution was poured into 2 liters of water with vigorous stirring to precipitate a polymer. The precipitated polymer was secured by filtration, was washed first with distilled water and then methanol, and finally dried at 100° C. for 5 hours.

The polymer thus obtained was dissolved into a mixture of 2 parts by weight of DMAc and 1 part by weight of NMP to achieve a concentration of 4 wt %. The solution was then filtered through a filter having a pore size of 0.5 µm to obtain a coating solution.

The coating solution was applied onto a glass substrate (having a transparent conductive film composed of ITO) by using a spinner at 2000 rpm in 30 seconds, then dried at 150° C. for 1 hour to evaporate the solvent. The fill thusly formed was rubbed by a rubbing device comprising nylon felt wound around a roll. The fill was rubbed five times at a roll speed of 800 rpm and at a stage traveling speed of 50 mm/second. The rubbing did not damage the paint film.

A pair of substrates, each with a liquid crystal orientation film prepared as described above, were arranged such that the orientation films faced each other with the rubbing directions in antiparallel. A 2 µm thick, 2 mm wide strip of polyethylene terephthalate fill ("Lumilar" produced by Toray Industries, Inc.) was kept between the substrates as a spacer, and an epoxy sealant ("Stract Bond" ES-4500 produced by Mitsui Toatsu Chemicals, Inc.) was applied to the sides of the substrates and hardened at 110° C. for 30 minutes. Inside the element, liquid crystal (ZLI-2293 produced by Merck) was poured in vacuum, and the inlet was closed by the epoxy sealant. The element was heated at 110° C. for 30 minutes both to harden the sealing resin and to effect the isotropic treatment of the liquid crystal.

The liquid crystal cell sample thusly prepared was rotated in the cross nicol of a polarization microscope and observed. Distinct light and darkness were observed, and it was found that the liquid crystal was well and evenly oriented in the rubbing directions. The pre-tilt angle of the liquid crystal cell was measured by the magnetic field capacity method and found to be 11 degrees. The pre-tilt angle of the cell was measured again after having been heated to 120° C. for 3 hours, and was found to be decreased only to 10.5 degrees.

EXAMPLE 2

A liquid crystal cell was prepared as in Example 1, except that 9.1 g (0.046 mole) of 4,4-diaminodiphenylmethane was used instead of 4,4'-diaminodiphenyl ether. As in Example 1, the liquid crystal was well oriented, and the pre-tilt angle was 10 degrees. After the liquid crystal cell was heated at 120° C. for 3 hours, the pre-tilt angle was 9.8 degrees.

EXAMPLE 3

A liquid crystal cell was prepared as in Example 1, except that 1.50 g (0.004 mole) of hexadecyl 3,5-diaminobenzoate was used instead of 3,5-diamino-N-octadecylbenzamide. The pre-tilt angle was 8 degrees, and after having been heated at 120° C. for 3 hours, the angle was 7 degrees.

EXAMPLE 4

A liquid crystal cell was prepared as in Example 1, except that 2.21 g (0.0075 mole) of 3,3',4,4'-biphenyltetracarboxylic dianhydride was used instead of pyromellitic dianhydride. The pre-tilt angle was 5.1 degrees, and after having been heated at 120° C. for 3 hours, the angle was 4.5 degrees.

EXAMPLE 5

A first solution of 8.5 grams (0.0425 mole) of 4,4-diaminodiphenyl ether was dissolved into 40 g of NMP, and a second solution of 16.6 g (0.0375 mole) of TDI dissolved in 20 g of DMAc was added to the first solution with stirring to form a first mixture. A third solution of 3.89 g (0.0075 mole) of 2,2-bis-4-(4-aminophenoxy)phenyl) hexafluoropropane dissolved into 30 g of DMAc was produced, and 2.71 g (0.0125 mole) of PMDA was added into the third solution. The third solution was stirred until the solid dissolved. This third solution and the first mixture were mixed and stirred at room temperature for 2 hours to obtain a precursor polymer solution. As in Example 1, a pyridine acetic anhydride treatment was effected to obtain an orienting material polymer, and a liquid crystal cell was prepared. The pre-tilt angle was 4 degrees, and after having been heated at 120° C. for 3 hours, the angle was 3.5 degrees.

EXAMPLE 6

A first solution of 3.84 grams (0.0194 mole) of 4,4-diaminodiphenylmethane was dissolved into 15 g of NMP, and a second solution of 3.31 g (0.019 mole) of TDI dissolved in 10 g of NMP was added to the first solution with stirring to form a first mixture. A third solution of 0.242 g (0.0006 mole) of 3,5-diamino-N-octadecylbenzamide dissolved into 5 g of DMAc was produced, and 0.217 g (0.001 mole) of PMDA was stirred into the third solution for reaction. This third solution and the first mixture were mixed and stirred in a three-neck flask with a reflux condenser at room temperature for 2 hours. To the polymer solution obtained, 5 g of triethylamine and 3 g of acetic anhydride were added, and the mixture was heated in an oil bath at 80° C. for 30 minutes with stirring. Then, 5 g of ethyl alcohol was added, and the mixture was heated for an additional 15 minutes. The reflux condenser was replaced by a connecting pipe for distillation, and a nitrogen introducing pipe was attached to one port. The oil bath temperature was raised to 100° C., and while nitrogen was fed gently, low boiling point ingredients were distilled away while stirring. Subsequently, the residue was diluted by DMAc to a solid concentration of 4% to prepare a coating solution.

The above solution was used to form an orientation film on a substrate, and a liquid crystal cell was prepared as in Example 1. The pre-tilt angle of the liquid crystal cell obtained was measured and found to be 8 degrees. The cell was heated at 120° C. for 3 hours, and the pre-tilt angle was again measured and found to be 7 degrees.

COMPARATIVE EXAMPLE 1.8 grams (0.009 mole) of 4,4'-diaminodiphenyl ether and 0.4 g (0.001 mole) of 3,5-diamino-N-octadecylbenzamide were dissolved into 10 g of NMP, and with stirring, and a solution with 1.74 g (0.01 mole) of TDI dissolved in 7 g of NMP was added dropwise. The mixture was stirred for an additional hour. The polymer solution obtained was diluted by DMAc to achieve a solid concentration of 4%, and the mixture was filtered through a filter having a pore size of 0.5 μm to prepare a coating solution. As in Example 1, an orientation film was formed, and a liquid crystal cell was prepared. The strength of the orientation film and the orientation of liquid crystal were good. The pre-tilt angle of the liquid crystal cell was measured and found to be 12 degrees. The liquid crystal cell was heated at 120° C. for 3 hours, and the pre-tilt angle was measured again and found to be greatly reduced to 6 degrees.

In Examples 1 to 6, the initial pre-tilt angles were all greater than 3.5 degrees, and the angles after heating were only slightly smaller. Conversely, in the Comparative Example, even though the initial pre-tilt angle was 12 degrees, the decline after heating was great, making practical application difficult.

In the liquid crystal display element of the present invention, the polymer film as a liquid crystal orientation film does not require high temperature heat treatment for production, thus allowing low treatment temperatures below about 150° C. Low treatment temperatures minimize the possibility of damaging other element materials, and a wider variety of materials may be used as substrates (e.g., plastics instead of glass) because heat resistance need not be as great. Moreover, the liquid crystal orientation film of the invention is excellent in such properties as liquid crystal orienting capability, heat resistance, transparency, strength and adhesion to the substrate. The film of the invention also possesses an especially large and stable pre-tilt angle. Consequently, the liquid crystal element of the present invention can be used very advantageously as a liquid crystal display element of an STN system.

Although this invention has been described with reference to specific forms of apparatus and method steps, equivalent steps may be substituted, the sequence of the steps may be varied, and certain steps may be used independently of others. Further, various other control steps may be included, all without departing from the spirit and the scope of the invention defined in the appended claims.

What is claimed is:

1. A liquid crystal orientation film having a polymer comprising a polyurea repeating unit and a polyimide repeating unit, wherein said film exhibits pre-tilt angle stability when subjected to temperatures exceeding 100° C.

2. A liquid crystal orientation film having a polymer comprising a repeating unit having the formula:

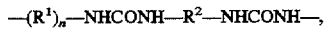

wherein $R^1$ is a divalent organic group and n is zero or one, and wherein $R^2$ is a divalent organic group; said polymer further comprising a second repeating unit having the formula

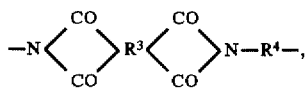

wherein $R^3$ is a tetravalent organic group, and $R^4$ is a divalent organic group,
wherein said film exhibits pre-tilt angle stability when subjected to temperatures exceeding 100° C.

3. A liquid crystal orientation film according to claim 2, wherein $R^4$ comprises at least one substituent group having the following formula:

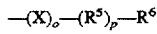

wherein X is a divalent connecting group and o is zero or one, $R^5$ is a divalent organic group and p is zero or one, and $R^6$ is selected from the group consisting of an alkyl group having at least 12 carbon atoms and a fluoroalkyl group having at least one carbon atom.

4. A liquid crystal orientation film according to claim 2, wherein $R^1$ is a divalent organic group having an aromatic ring.

5. A liquid crystal orientation fill according to claim 2, wherein $R^1$ comprises at least one divalent organic group selected from the group consisting of:

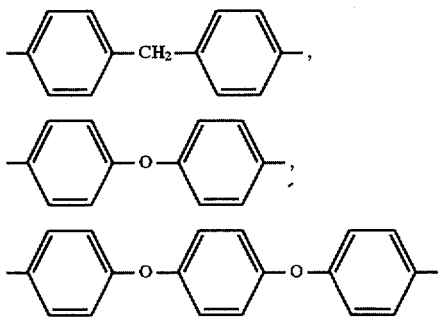

and

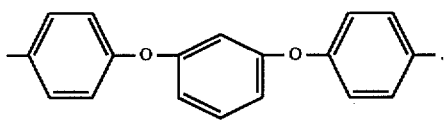

6. A liquid crystal orientation fill according to claim 2, wherein n is zero.

7. A liquid crystal orientation film according to claim 2, wherein $R^2$ is a divalent organic group having an aromatic ring.

8. A liquid crystal orientation film according to claim 2, wherein $R^2$ comprises at least one divalent organic group selected from the group consisting of

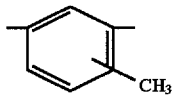

and

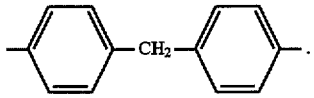

9. A liquid crystal orientation film according to claim 2, wherein $R^3$ is a tetravalent organic group having an aromatic ring.

10. A liquid crystal orientation film according to claim 2, wherein $R^3$ is a tetravalent organic group having the formula:

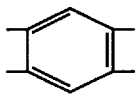

11. A liquid crystal orientation film according to claim 2, wherein $R^4$ is a divalent organic group having an aromatic ring.

12. A liquid crystal orientation film according to claim 2, wherein $R^4$ is selected from the group consisting of an m-phenylene group and a p-phenylene group.

13. A liquid crystal orientation film according to claim 3, wherein $R^6$ is an alkyl group having 14 to 20 carbon atoms.

14. A liquid crystal orientation film according to claim 2, wherein the mole ratio of the first repeating unit to the second repeating unit in said polymer is about 98/2 to about 60/40.

15. A liquid crystal display element having a liquid crystal orientation film, said film comprising a polymer having a polyurea repeating unit and a polyimide repeating unit, wherein said film exhibits pre-tilt angle stability when subjected to temperatures exceeding 100° C.

* * * * *

UNITED STATES PATENT AND TRADEMARK OFFICE
CERTIFICATE OF CORRECTION

PATENT NO. : 5,686,558
DATED : Nov. 11, 1997
INVENTOR(S) : Kazuo Kitamura, et al It is certified that error appears in the above-indentified patent and that said Letters Patent is hereby corrected as shown below:

In Column 2, at line 40, please change "fill" to --film--.

In Column 5, at line 49, please change "(VI)" to --(VII)--.

In Column 8, at line 53, please change "fill" to --film--; and at line 55, please change "fill" to --film--.

Signed and Sealed this

Twenty-fourth Day of February, 1998

Attest:

BRUCE LEHMAN

*Attesting Officer*  *Commissioner of Patents and Trademarks*